M. V. B. ROWLEY.
Churn.
No. 69,029. Patented Sept. 17, 1867.
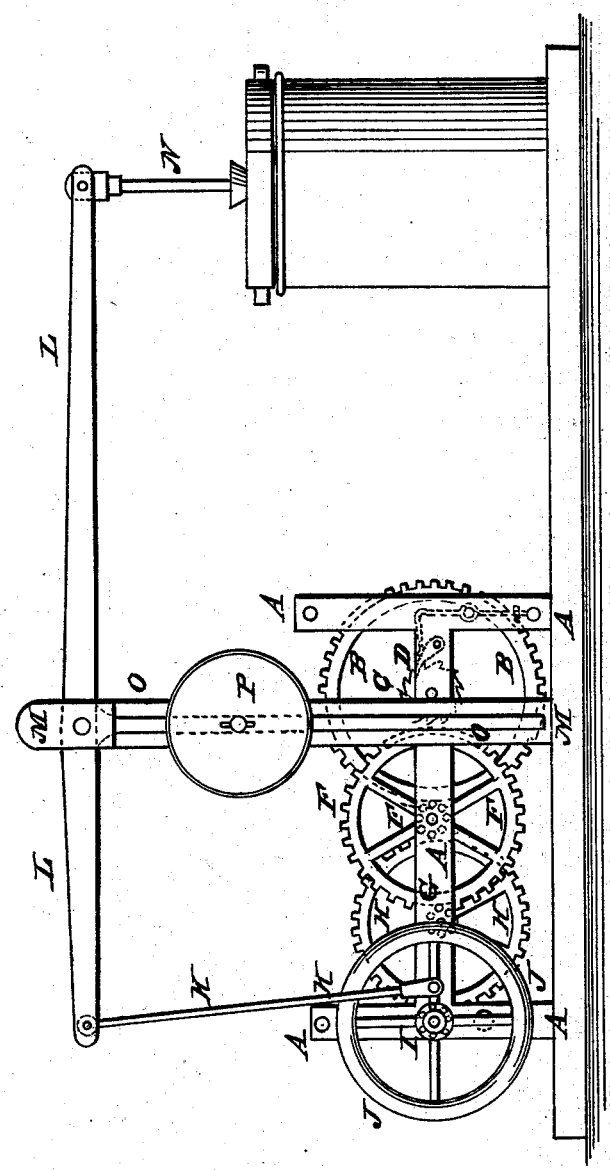

United States Patent Office.

M. V. B. ROWLEY, OF WORCESTER, NEW YORK.

Letters Patent No. 69,029, dated September 17, 1867.

---

IMPROVEMENT IN CHURNS.

---

The Schedule referred to in these Letters Patent and making part of the same.

---

TO ALL WHOM IT MAY CONCERN:

Be it known that I, M. V. B. ROWLEY, of Worcester, in the county of Otsego, and State of New York, have invented a new and useful Improvement in Churning Machine; and I do hereby declare that the following is a full, clear, and exact description thereof, which will enable others skilled in the art to make and use the same, reference being had to the accompanying drawings, forming part of this specification.

The figure is a side view of my improved machine.

My invention has for its object to furnish an improved machine, by means of which a churn may be operated at any desired speed, steadily and regularly, bringing the butter in a very short time; and it consists in the combination of the adjustable pendulum, working-beam, pitman, and crank-wheel with each other, as hereinafter more fully described, so that it will be impossible for the crank-wheel to become set upon its dead-points.

A is a framework secured to the floor or platform upon which the churn stands. B is a wheel, in a cap attached to which is coiled a strong steel spring, in the manner of a clock-spring, one end of said spring being attached to the said cap, and the other to the shaft of the wheel B. The shaft of the wheel B is held stationary, while the spring uncoils itself by the ratchet-wheel C and pawl D. The teeth of the wheel B mesh into the teeth of the pinion-wheel E attached to the shaft of the wheel F. The teeth of the wheel F mesh into the teeth of the pinion-wheel G attached to the shaft of the wheel H. The teeth of the wheel H mesh into the teeth of the pinion-wheel I attached to the shaft of the crank-wheel J. K is a pitman, the lower end of which is pivoted to the crank-pin of the wheel J, and its upper end is pivoted to the rear end of the working-beam L, which is pivoted to the upper end of the post M, and to the forward end of which is pivoted the upper end of the dasher-handle N. To the working-beam L, just below its pivotal point, is attached the upper end of the pendulum-rod O, upon which the pendulum-ball P is adjustably secured by a set-screw, so that it may be raised or lowered, as desired. The pendulum and crank-pin are so arranged that the pendulum-ball shall be at the highest point at the same time that the crank is on its dead-points, so that it will be impossible for the said crank-wheel ever to become set upon its dead-points.

I claim as new, and desire to secure by Letters Patent—

1. The working-beam L, securely attached to the pendulum-rod O, whereby the pitman K is carried past its centre, as herein set forth, for the purpose specified.

2. The combination of the working-lever L, pendulum and rod O P, pitman K, and crank-wheel J, substantially as described, for the purpose specified.

The above specification of my invention signed by me this 9th day of April, 1867.

M. V. B. ROWLEY.

Witnesses:
   WM. F. McNAMARA,
   JAMES T. GRAHAM.